United States Patent
Hosaka et al.

[11] 3,881,170
[45] Apr. 29, 1975

[54] VEHICLE TIRE ABNORMALITY INDICATOR WITH INDUCTIVE COUPLING MEANS

[75] Inventors: Akio Hosaka, Yokohama; Kiyoshi Wazawa, Fujisawa, both of Japan

[73] Assignee: Nissan Motor Company, Limited, Yokohama, Japan

[22] Filed: Mar. 26, 1973

[21] Appl. No.: 344,486

[30] Foreign Application Priority Data
Mar. 27, 1972   Japan ............................. 47-35046

[52] U.S. Cl. ............... 340/52 F; 73/146.5; 340/57; 340/58
[51] Int. Cl. ..................... G08b 19/00; B60c 23/04
[58] Field of Search ..................... 340/58, 57, 52 F; 73/146.5

[56] References Cited
UNITED STATES PATENTS

| | | |
|---|---|---|
| 3,155,938 | 11/1964 | Meyers ............................. 340/58 |
| 3,602,884 | 8/1971 | Brumbelow ....................... 340/58 |
| 3,715,719 | 2/1973 | Sugiyama ......................... 340/58 |

*Primary Examiner*—Glen R. Swann, III

[57] ABSTRACT

A sensor including a pressure switch and a thermistor mounted within the tire assembly for detecting a too low air pressure and excessive tire temperature is coupled to a detector unit, and a warning unit both mounted on the vehicle body, through concentrically disposed primary and secondary coils. The primary coil is secured on the inner periphery of the wheel rim and is electrically connected to the sensor. The secondary coil is secured on an axially extending portion of an annular support member which is fixed rigidly with respect to the axle support assembly.

4 Claims, 3 Drawing Figures

VEHICLE TIRE ABNORMALITY INDICATOR WITH INDUCTIVE COUPLING MEANS

BACKGROUND OF THE INVENTION

This invention relates to a device that automatically detects certain undesirable and abnormal conditions in a vehicle tire, such as a substandard air pressure or an excessive tire temperature, to give a warning to the driver.

In order that the vehicle tires perform their essential functions, it is important to maintain a proper pressure in the tires. Low pressure will cause not only hard steering but also uneven tread wear resulting in decreased service life. A tire with insufficient pressure will tend to induce "standing waves" during high speed driving, as a result of which the tire is deformed polygonally. Insufficient air pressure will also cause a "hydroplaning" phenomenon when driving in rainy weather. Both of these unusual conditions often cause serious accidents. Still further, a tire with improper pressure heats up excessively due to the internal friction of the carcass members, and becomes most dangerous in that a blowout is liable to occur.

DESCRIPTION OF THE PRIOR ART

Various methods of detecting such abnormal conditions in vehicle tires have heretofore been proposed and demonstrated. One typical detecting method is to use a sensor unit mounted on the tire which is coupled to a detector unit on the vehicle's frame or body through annular primary and secondary coils mounted on the axle assembly of the vehicle. The detector unit is of the type capable of detecting a change in the inductance of the secondary coil resulting from the abnormal conditions in the tire. However, in devices of this type, difficulties are experienced in finding suitable locations for mounting the primary and secondary coils on the axle assembly, since the space available for mounting the windings is restricted. Furthermore, these devices cannot be readily installed on the tire assembly of the existing type without requiring numerous parts for mounting.

OBJECTS OF THE INVENTION

It is an object of the present invention to provide an improved device for detecting abnormal conditions in vehicle tires, which is characterized in that it does not require a large space for mounting.

Another object of the present invention is to provide an improved device of the aforementioned type which can be readily mounted on the tire assembly of the existing type.

It is a further object of the present invention to provide an improved device of the aforementioned type in which each primary coil is mounted on the inner periphery of a wheel rim and each secondary coil is fixed rigidly with respect to an axle support assembly concentrically with the corresponding primary coil.

It is still further object of the present invention to provide an improved device of the aforementioned type in which, if the primary and secondary coils are broken, there is little likelihood of the fragments of the broken coils causing damage to the brake assembly mounted in their vicinity.

These and other objects will become readily apparent from the following description of the invention when read in conjunction with the accompanying drawings.

DESCRIPTION OF THE PREFERRED EMBODIMENT

Figure 1:
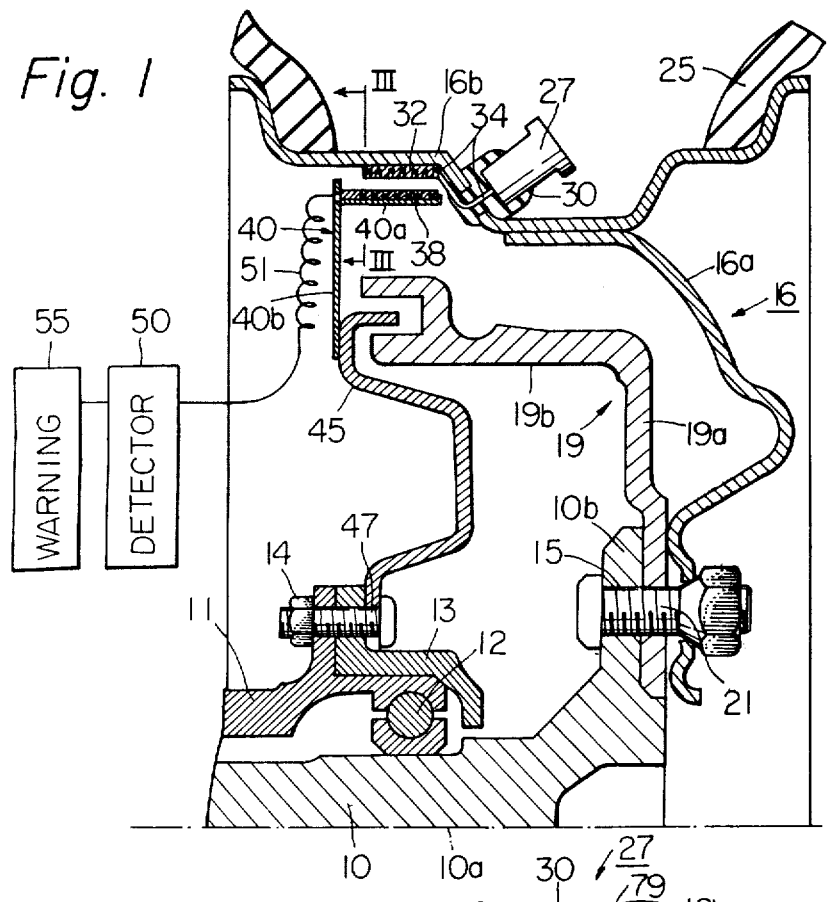
FIG. 1 is a fragmentary longitudinal section of a tire and wheel assembly incorporating the device according to the invention.

Referring now to FIG. 1, there is shown schematically a portion in section of the tire and wheel assembly on which the device of the invention is mounted. Designated by 10 is an axle shaft, the upper half of which only is herein shown for the sake of simplicity of illustration. The axle shaft 10 is of the conventional type having an axis 10a about which the tire and wheel assembly rotates. An axle case 11 is provided and rotatably supported by the axle shaft 10 by means of a bearing 12 provided therebetween. The bearing 12 is held in place by an axle cage or box 13 which is secured to the axle case 11 by means of bolt and nut assemblies 14. The axle shaft 10 includes a radially extending portion 10b having formed therein a plurality of openings 15 (one of which is shown in FIG. 1) for mounting the tire and wheel assembly on to the axle 10.

The tire and wheel assembly includes a road wheel 16 of a special sectional construction having a generally radially extending portion 16a and a generally axially extending portion or rim 16b. The innermost end of the road wheel 16 is provided with a plurality of openings each corresponding to one of the openings 15 formed in the radially extending portion 10b of the axle shaft 10. The road wheel 16, together with a brake drum 19, is secured to the axle shaft portion 10b by means of a plurality of bolt and nut assemblies 21. The brake drum 19, as is seen, is of a conventional type including a radially extending portion 19a and an axially extending portion 19b, the axially extending portion 19b being bifurcated at its outermost end when viewed in cross section. A tire casing 25 is mounted on the rim portion 16b of the road wheel 16 in a conventional manner. As will be understood, the invention is described as it applies to a tubeless tire which is mounted on the rim in such a manner that the air is retained between the rim and the tire casing.

A sensor unit 27 is mounted on the upper surface of the rim portion 16b of the road wheel 16 so as to sense the air pressure in the tire as well as the tire temperature. Even though the sensor is mounted on the rim instead of the tire itself, it is understood, that the sensed temperature is substantially the same as that of the tire. The mounting of the sensor unit 27 is accomplished by employing a seal member 30 of rubber or other suitable material which is mounted in an opening formed in the rim portion 16b to sealingly secure the sensor unit 27 on the rim portion 16b. The sensor unit 27 has two terminals, one of which is connected to the road wheel 16 for grounding, and the other one is connected to a primary coil 32 through a wire 34 extending through the seal member 30.

According to one feature of the present invention, the primary coil 32 is positioned to extend onto the inner periphery of the rim 16b of the road wheel 16, as different from known arrangements in which the primary coil is mounted adjacent the axle shaft. The numerous advantages resulting from such mounting will be described later in detail. The primary coil 32, before being mounted on the rim 16b, is subjected to resin treatment so that the coil 32 is coated with a suitable resin. After treatment, the primary coil 32 is fitted on the rim 16b by force exerted thereonto and held in place by friction or by means of a suitable adhesive material.

Figure 3:
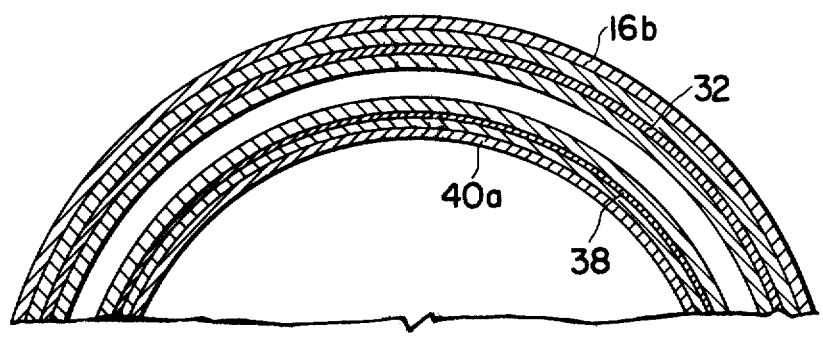
FIG. 3 is a fragmentary sectional view taken on line III—III of FIG. 1.

Positioned in a concentric relation to the primary coil 32 is a secondary coil 38 which is of a somewhat smaller diameter than the primary coil 32. It is to be noted that the coils 32 and 38 are annular coils in concentric relationship, as clearly seen in FIG. 3. The secondary coil 38 is also treated with resin and is supported on an axially extending annular portion 40a of an support member 40. The support member 40 also includes a radially extending portion 40b, the innermost end of which is secured to a back plate 45 by welding or some other suitable method. The back plate 45 is formed at its inner end with a plurality of openings 47 through which the back plate 45 is secured to the axle case 11 by means of the bolt and nut assemblies 14. The secondary coil 38 has two terminals, one of which is connected to the support member 40 for grounding and the other one is connected to a detector unit 50 through a wire 51. The detector unit 50 is of a known type capable of detecting a change in the inductance of the secondary coil 38 resulting from the abnormal conditions in the tire. Upon detection of the change, the detector unit 50 actuates a warning or alarm unit 55 to give a warning to the driver.

Although, in the illustrated embodiment, the support member 40 is secured to the back plate 45 to fixedly support thereon the secondary coil 38 in a concentric relation to the primary coil 32, it should be noted that the support member 40 may be integrally formed with the back plate 45. Further, it should be noted that the invention is equally applicable to a tire and wheel assembly incorporating a brake other than the illustrated drum brake, e.g., a disc brake.

Figure 2:
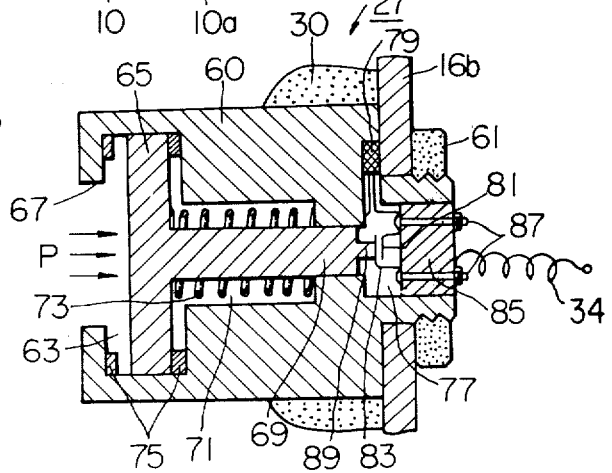
FIG. 2 is a longitudinal section of a typical sensor unit shown in FIG. 1 on an enlarged scale.

Referring to FIG. 2, there is shown a typical example of the sensor unit 27 employed in the present device. The sensor unit 27 includes a generally cylindrical casing 60 which is mounted on the rim portion 16b through the seal member 30 by means of a nut 61 threaded on one end of the casing 60.

The casing 60 has a chamber 63 within which a pressure-sensitive piston 65 is mounted for axial sliding movement therein. The chamber 63 opens to the interior of the tire casing (not shown in FIG. 2) through an opening 67 in the casing 60.

A piston rod 69 is secured to or formed integral with the piston 65 and extends axially and centrally through the casing 60. As shown, the chamber 63 also extends axially to form a chamber 71 for accommodating a spring 73. The spring 73 serves to bias the piston 65 in a left-hand direction as viewed in FIG. 2. In order to prevent leakage of air into the chamber 71, two annular seals 75 are mounted within the chamber 63 in a conventional manner.

The casing 60 also has a bore 77 formed therein to accommodate a contact assembly and a PTC (positive temperature coefficient) thermistor 79 of the sensor unit 27. The contact assembly comprises a fixed contact 81 and a movable contact 83, both being secured at their ends on an insulating member 85 fitted into the bore 77, by means of bolt and nut assemblies 87. The piston rod 69 has its tip 89 extending into the bore 77, and the tip 89 is adapted to urge the movable contact 83 in the right-hand direction, that is, toward the fixed contact 81, as the air pressure in the tire increases, moving the piston rod 69 in the right-hand direction against the action of the spring 73. The force of the spring 73 is so selected that when the air pressure exceeds a predetermined value the movable contact 83 is brought into contact with the fixed contact 81 by the piston rod 69. Thus, it will be understood that the fixed and movable contacts 81 and 83 are engaged when the air pressure is above the predetermined value, while they are disengaged when the air pressure is below the predetermined value, that is, during the abnormal conditions.

The PTC thermistor 79 is of the type which exhibits, at a critical temperature, a resistance change as great as $10^3$ with a temperature change of approximately 10°C. With the employment of such a thermistor, it is possible to detect a tire temperature having reached a predetermined above which an abnormal condition in the tire is deemed to exist.

The thermistor 79 is securely mounted within the bore 77 and has one lead connected to the same bolt as that securing the fixed contact 81. The other lead of the thermistor 79 is connected to the casing 60 and is thus grounded to the body of the vehicle. The thermistor 79 and the pressure switch comprising the fixed and movable contacts 81 and 83, respectively, are connected in series between the wire 34 and ground. It should be noted that a bimetal may be employed in place of the thermistor 79.

Although one preferred example of the sensor unit 27 has been described above, it should be noted that other sensor unit types can equally be employed. Furthermore, it should be understood that the detector unit 50 and the warning unit 55 are known in the art and thus the description of the construction and operation of those units has been omitted.

As has been described above, this invention provides an improved device for detecting abnormal conditions in vehicle tires, which has many advantages over similar devices of the prior art. One advantage lies in the fact that there is a relatively large space available for mounting the present device on the tire assembly. In addition, there is no need to employ a connector for connecting the sensor unit with the primary coil due to the fact that the primary coil is also mounted on the rim and thus is not required to be disconnected from the sensor unit during tire removal or replacement. Furthermore, the sensor unit and the primary and secondary coils can be readily installed on the tire and wheel assembly by merely removing the tire from the wheel rim. Since the coils are mounted externally of the brake drum, there is little likelihood that fragments of the coils give damage to the brake assembly if the coils are broken.

What is claimed is:

1. A device for automatically detecting and indicating abnormal conditions in an pneumatic tire, mounted on a rim portion of a road wheel of a wheeled vehicle, including the tire internal pressure below a predetermined value and tire temperature above a predetermined value, comprising a tire condition sensor mounted on the rim portion and extending into the interior of the pneumatic tire to product an electric signal upon the occurence of tire abnormality;

coupling means responsive to said electric signal comprising an annular primary coil secured to and extending along the inner periphery of the rim of the road wheel for rotation with the tire, said primary coil being electrically connected to said tire condition sensor, and an annular secondary coil attached to a relatively stationary portion of the vehicle and disposed adjacent to said primary coil, inwardly of said rim of said road wheel, said annular secondary coil being surrounded by said primary coil in concentric relationship therewith for continuous inductive coupling to said primary coil, whereby the secondary coil exhibits a marked inductance change when said tire condition sensor produces the electric signal;

detector means connected to the secondary coil to detect said marked inductance change; and warning means connected to said detector means for warning the driver of the detected tire abnormality in response to the marked inductance change.

2. A device according to claim 1, wherein said relatively stationery portion of the vehicle includes an annular support portion on which said annular secondary coil is disposed and a back plate which supports said support portion.

3. A device according to claim 2 wherein said annular support portion is secured to said back plate.

4. A device according to claim 2, wherein said annular support portion is formed integrally with said back plate.

* * * * *